United States Patent Office 2,847,424
Patented Aug. 12, 1958

2,847,424

HALOGENATED ESTERS OF NITROFURFURYL ALCOHOL

William C. Ward, Norwich, N. Y., assignor, by mesne assignments, to The Norwich Pharmacal Company, Norwich, N. Y., a corporation of New York No Drawing. Application July 3, 1953
Serial No. 366,074

6 Claims. (Cl. 260—347.4)

This invention relates to fungicidal agents and aims to provide a new series of chemical compounds having fungicidal activity and to fungicidal compositions wherein the active agent is a member of my new series of compounds.

The new series of chemical compounds which I have invented includes a number of closely-related nitrofurans which may be described broadly as halogenated esters of nitrofurfuryl alcohol. They are represented by the general formula:

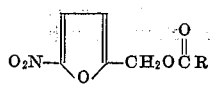

wherein R represents a member of the group consisting of bromo-, chloro-, and iodo-lower alkyl and chlorophenyl.

I have discovered that the members of my new series of compounds exhibit a surprising degree of toxicity to fungi and they can be very readily incorporated in fungicidal compositions as the active ingredient thereof.

The various agents which have been used in the past to combat fungi have generally exhibited antimycotic activity against only a few species of fungi. The members of my new series of compounds differ therefrom in that they exhibit antimycotic activity of a surprisingly high order against a wide spectrum of fungi. Even when present in high dilution, the members of my new series of compounds are extraordinarily inimical to fungi in general.

The method which I prefer to employ in the preparation of the members of my new series of compounds consists in causing 5-nitro-2-furfuryl alcohol to react with the appropriate halogenoacyl halide. For instance, 5-nitro-2-furfuryl chloroacetate, 5-nitro-2-furfuryl-β-chloropropionate, 5-nitro-2-furfuryl-p-chlorobenzoate, 5-nitro-2-furfuryl-α-chlorobutyrate, 5-nitro-2-furfuryl bromoacetate, and other compounds embraced by the general formula given above, can be readily prepared thereby in good purity and yield with a minimum of manipulative effort.

Other methods which may be practiced to prepare members of my new series of compounds include:
(1) The reaction of 5-nitro-2-furfuryl alcohol with the appropriate halogenoaliphatic acid;
(2) The process of ester exchange illustrated by the following series of reactions:

(a) 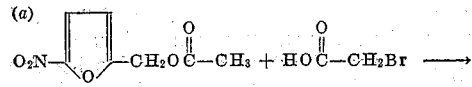
5-nitro-2-furfuryl acetate   bromoacetic acid

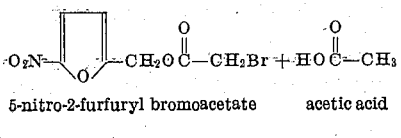
5-nitro-2-furfuryl bromoacetate   acetic acid (b) 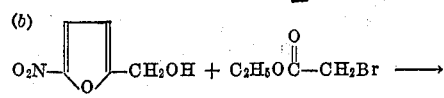
5-nitro-2-furfuryl alcohol   ethyl bromoacetate

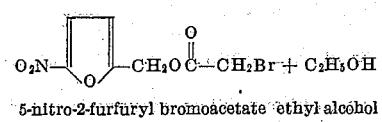
5-nitro-2-furfuryl bromoacetate   ethyl alcohol (c) 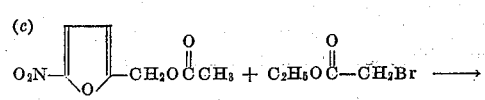
5-nitro-2-furfuryl acetate   ethyl bromoacetate

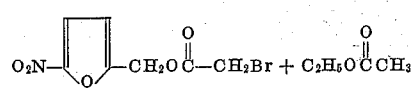
5-nitro-2-furfuryl bromoacetate   ethyl acetate and (3) The nitration of halogenated esters of furfuryl alcohol.

In order that this invention may be fully available to those skilled in the art, the preparation of illustrative members of my new series of compounds will be described briefly:

EXAMPLE I 5-nitro-2-furfuryl chloroacetate

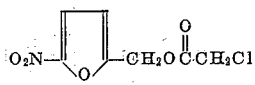

In a 500 ml. three-necked round-bottomed flask fitted with a stirrer, addition funnel, and reflux condenser is placed a solution of 32 g. (0.224 mole) of 5-nitro-2-furfuryl alcohol in 100 ml. of dioxane. The stirrer is started and 26 g. (17.5 ml., 0.232 mole) of chloroacetyl chloride is added dropwise. After complete addition the reaction mixture is heated for one hour on the steam bath and then cooled to room temperature. The cooled mixture is poured into 200 ml. of sodium bicarbonate solution, and more solid sodium bicarbonate is added if necessary, to completely decompose the excess chloroacetyl chloride. Pale yellow crystals separated from the mixture and were removed by filtration and recrystallized from 99% isopropanol using 8.7 ml. of solvent per gram of crude solid. The yield is 40.7–42.1 g. (86–89%) of product melting at 111.5–112.5° C.

EXAMPLE II 5-nitro-2-furfuryl-β-chloropropionate

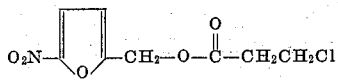

To a solution of 12.4 g. (.086 mole) of 5-nitro-2-furfuryl alcohol in 50 cc. dioxane is added dropwise while stirring at room temperature, 11.0 g. (.086 mole) of β-chloropropionyl chloride. Eight cc. (.086 mole) of pyridine is added at room temperature. The reaction mixture is stirred and refluxed on the steam bath for one hour and then poured into 100 cc. of cold saturated sodium bicarbonate solution. Excess solid sodium bicarbonate is added to make the solution basic. An oil separates which is extracted with ether and dried over Drierite. The ether is removed and the concentrate distilled using the oil pump and a wax bath. 9.88 g. (49% crude yield) is obtained, B. P. 160–180° C./5.5 mm. with the bath at 200–215° C. Further distillation gives a fraction B. P. 165–168° C./1.4 mm. with a refractive index of 1.5374 at 27° C.

EXAMPLE III

5-nitro-2-furfuryl-p-chlorobenzoate

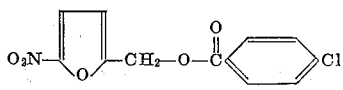

To a solution of 5.0 g. (0.35 mole) of 5-nitro-2-furfuryl alcohol in 20 cc. dioxane is added dropwise 6.1 g. (.035 mole) of p-chlorobenzoyl chloride while stirring at room temperature. 3.5 cc. (.04 mole) of pyridine is added, which caused the solution to become very warm. An additional 20 cc. dioxane is added. The reaction mixture is stirred and refluxed on the steam bath for two hours. The solution is poured into 100 cc. of cold saturated sodium bicarbonate solution and made basic by adding additional solid sodium bicarbonate. A precipitate formed which is filtered off and washed with water. Recrystallization from SDA No. 30 alcohol (Darco) gives 3.62 g. (36.9%) of a white solid melting at 83–84° C.

EXAMPLE IV

5-nitro-2-furfuryl-α-chlorobutyrate

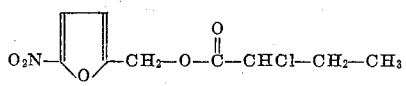

To a solution of 17.1 g. (.12 mole) of 5-nitro-2-furfuryl alcohol in 60 cc. dioxane is added dropwise while stirring at room temperature 16.8 g. (.12 mole) of α-chlorobutyryl chloride. 10 cc. (.12 mole) of pyridine is added at room temperature which causes the reaction mixture to darken and become warm. The reaction mixture is stirred and heated on the steam bath for one hour and then poured into 100 cc. of cold saturated sodium bicarbonate solution. Additional solid sodium bicarbonate is added until the solution becomes basic. The oil which forms is extracted with ether and the ether solution dried over Drierite. The ether is removed and the concentrate distilled using an oil pump and a wax bath. 20.01 g. (67.2%) B. P. 160–163° C./1.6 mm. is obtained with the bath at 200–210° C. Further distillation gives material B. P. 169–170° C./2.7 mm. which had a refractive index of 1.5263 at 24° C.

EXAMPLE V

5-nitro-2-furfuryl bromoacetate

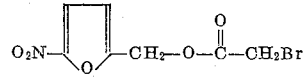

To a solution of 21.6 g. (.15 mole) of 5-nitro-2-furfuryl alcohol in 20 cc. of dioxane is added dropwise over one-half hour 30.8 g. (.15 mole) of bromoacetyl bromide while stirring at room temperature. The reaction mixture is poured into 100 cc. of cold saturated sodium bicarbonate solution to decompose the excess bromoacetyl bromide. More solid sodium bicarbonate is added to make the solution basic. The orange-brown solid which settles out is filtered off, washed with water, and recrystallized from isopropyl alcohol using Darco. The yield is 18 g. (45.5%) of yellowish-white product melting at 92–94° C.

EXAMPLE VI

5-nitro-2-furfuryl iodoacetate

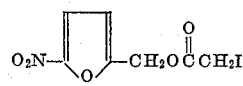

To a solution of 100 g. of 5-nitro-2-furfuryl chloroacetate in acetone is added 70 g. of sodium iodide in 450 cc. of acetone. The solution is allowed to remain overnight at room temperature following which the sodium chloride was removed by filtration. The filtrate is evaporated to remove most of the acetone and the residue poured into one liter of cold water. The mixture is filtered and the solid recrystallized from 700 cc. of isopropanol. Yield 129 g., 91%, M. P. 63–64°C.

The scope of the antimycotic activity of members of my new series of compounds is demonstrated, in part, in the following table wherein there are set forth the results of the exposure of various species of fungi such as *Candida albicans, Cryptococcus neoformans, Trichophyton mentagrophytes, Microsporum canis* and *Blastomyces dermatitidis* to the action of such compounds:

TABLE I

| Compound | Conc., mg. Percent | C. albicans | | | | C. neoformans | | | T. mentagrophytes | | | M. canis | | B. dermatitidis | | |
|---|---|---|---|---|---|---|---|---|---|---|---|---|---|---|---|---|
| | | 24 hr. | 72 hr. | 96 hr. | 144 hr. | 24 hr. | 72 hr. | 144 hr. | 48 hr. | 96 hr. | 144 hr. | 96 hr. | 144 hr. | 48 hr. | 96 hr. | 144 hr. |
| 5-Nitro-2-furfuryl bromoacetate | 4 | 18 | | | 15 | 20 | | 13 | 18 | 11 | 11 | 33 | 12 | 17 | 11 | 11 |
| 5-Nitro-2-furfuryl p-chlorobenzoate | 14 | | | | | | | | 9 | 5 | 5 | 17 | 5 | 11 | 7 | 7 |
| 5-Nitro-2-furfuryl α-chlorobutyrate | 19 | 15 | 11 | | | 10 | | | 7 | 5 | 5 | 20 | 6 | 12 | 9 | 9 |
| 5-Nitro-2-furfuryl β-chloropropionate | { 19<br>1 | 20 | 10 | | | 16 | | | 23 | 17 | | 55 | 40 | 15 | 15 | 10 |
| 5-Nitro-2-furfuryl iodoacetate | 12, 19 | | | 40 | 19 | | | | | 32 | 19 | 45 | 25 | | | |
| Ethanol (50%) | | 0 | 0 | 0 | 0 | 0 | 0 | 0 | 0 | 0 | 0 | 0 | 0 | 0 | 0 | 0 |

The testing procedure employed to obtain the antifungal spectrum given in Table I was briefly as follows:

Stock cultures of the various species of fungi were maintained by Mycophil agar. To test the antifungal activity Sabouraud dextrose agar was used.

Spore suspensions of each of the fungi species were prepared in Ringer's solution employing ten day old cultures grown on Mycophil agar slants at room temperature (26±2° C.). A separation of spores from mycelium was accomplished by gentle agitation and passage of supernatant material through fine gauze. The presence of spores was determined by microscopic examination.

One ml. of spore suspension of each of the fungi species was added to a series of tubes containing 20 ml. of liquid Sabouraud dextrose agar (47° C.) and the mixture vigorously agitated and poured into petri dishes and allowed to harden.

Sterile stainless steel cylinders (6 mm. x 10 mm.) were placed centrally on the surface of each of the petri plates containing the hardened agar spore mixture.

The compounds were dissolved in a suitable inactive vehicle at the desired concentration to be tested and approximately 0.2 ml. placed into each of the steel cylinders. The plates were then incubated at room temperature (26±2° C.).

The species of fungi used herein exhibit variable growth rates and for this reason measurements of the inhibition zones produced by the test compounds were made at different time intervals.

The various members of the new series of compounds which I have invented can be easily combined with carriers of various kinds to provide fungicidal compositions whereby the fungicidal nitrofuran can be applied directly and in proper concentration to the organic material to be treated. The new compounds exhibit good solubility in simple, frequently used solvents such as mineral oil, carbon tetrachloride, propylene glycol, polyethylene glycols, hydrocarbons, butylacetate, Cellosolve, sorbitan partial fatty acid esters and their polyoxethylene derivatives commonly referred to as "Spans" and "Tweens," ethanol, and the like. Also, they can be easily mixed with finely divided inert materials such as talc, clay, bentonite, and the higher carbowaxes. Illustrative formulations for fungicidal compositions embodying my invention are as follows:

OINTMENT

| | Percent |
|---|---|
| Stearic acid | 11.0 |
| Cetyl alcohol | 5.0 |
| Tween 60 (sorbitan monostearate hydroxypolyoxyethylene ether with 20 oxyethylene groups per mol) | 5.0 |
| Tween 61 (sorbitan monostearate hydroxypolyoxyethylene ether with 4 oxyethylene groups per mol) | 2.0 |
| Propylene glycol | 10.0 |
| Water | 66.8 |
| 5-nitro-2-furfuryl chloroacetate | 0.2 |

This composition, when tested by the agar cup plate method with *Trichophyton mentagrophytes* as the organism, showed a 10.0 mm. zone of inhibition over a seven day period.

LIQUID

| | Percent |
|---|---|
| Polyethylene glycol (approximate molecular weight=300) | 99.0 |
| 5-nitro-2-furfuryl chloroacetate | 1.0 |

When tested in the manner given above for the ointment formulation, a 10 mm. zone of inhibition was obtained over a seven day period.

TINCTURE

| | | |
|---|---|---|
| 5-nitro-2-furfuryl chloroacetate | grams | 0.892 |
| Propylene glycol | grams | 8.920 |
| Acetone | cc | 10.000 |
| Isopropanol | cc | 50.500 |
| Water, q. s | cc | 100.000 |

DUSTING POWDER

| | Percent |
|---|---|
| 5-nitro-2-furfuryl chloroacetate | 0.5 |
| Talc | 50.0 |
| Starch | 25.0 |
| Carbowax 6000 | 24.5 |

What I claim is:

1. A compound having fungicidal activity and represented by the formula:

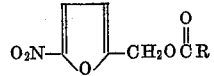

wherein R represents a member of the group consisting of bromo-, chloro-, and iodo-lower alkyl and chlorophenyl.

2. 5-nitro-2-furfuryl chloroacetate represented by the formula:

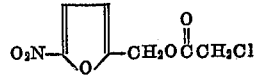

3. 5-nitro-2-furfuryl-β-chloropropionate represented by the formula:

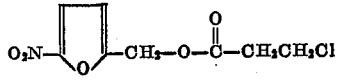

4. 5-nitro-2-furfuryl-p-chlorobenzoate represented by the formula:

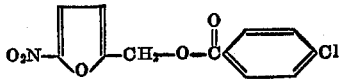

5. 5-nitro-2-furfuryl bromoacetate represented by the formula:

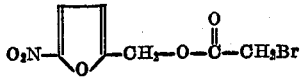

6. 5-nitro-2-furfuryl iodoacetate represented by the formula:

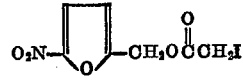

References Cited in the file of this patent

UNITED STATES PATENTS

| 2,319,481 | Stillman et al. | May 18, 1943 |
| 2,410,197 | Borglin | Oct. 29, 1946 |

OTHER REFERENCES

Ward et al.: J. Am. Pharm. Assoc. 37, 317–319 (1948).
Frear et al.: J. Econ. Entomol. 40, 736–741 (1947).
Horsfall: "Fungicides and Their Action," page 151 Chronica Botanica Co., Waltham, Mass.